July 31, 1928.

M. S. KELLEY 1,678,911

DIRIGIBLE HEADLIGHT

Filed Oct. 25, 1926

M. S. Kelley Inventor

By C. A. Snow & Co.
Attorney

July 31, 1928.  M. S. KELLEY  1,678,911
DIRIGIBLE HEADLIGHT
Filed Oct. 25, 1926  2 Sheets-Sheet 2
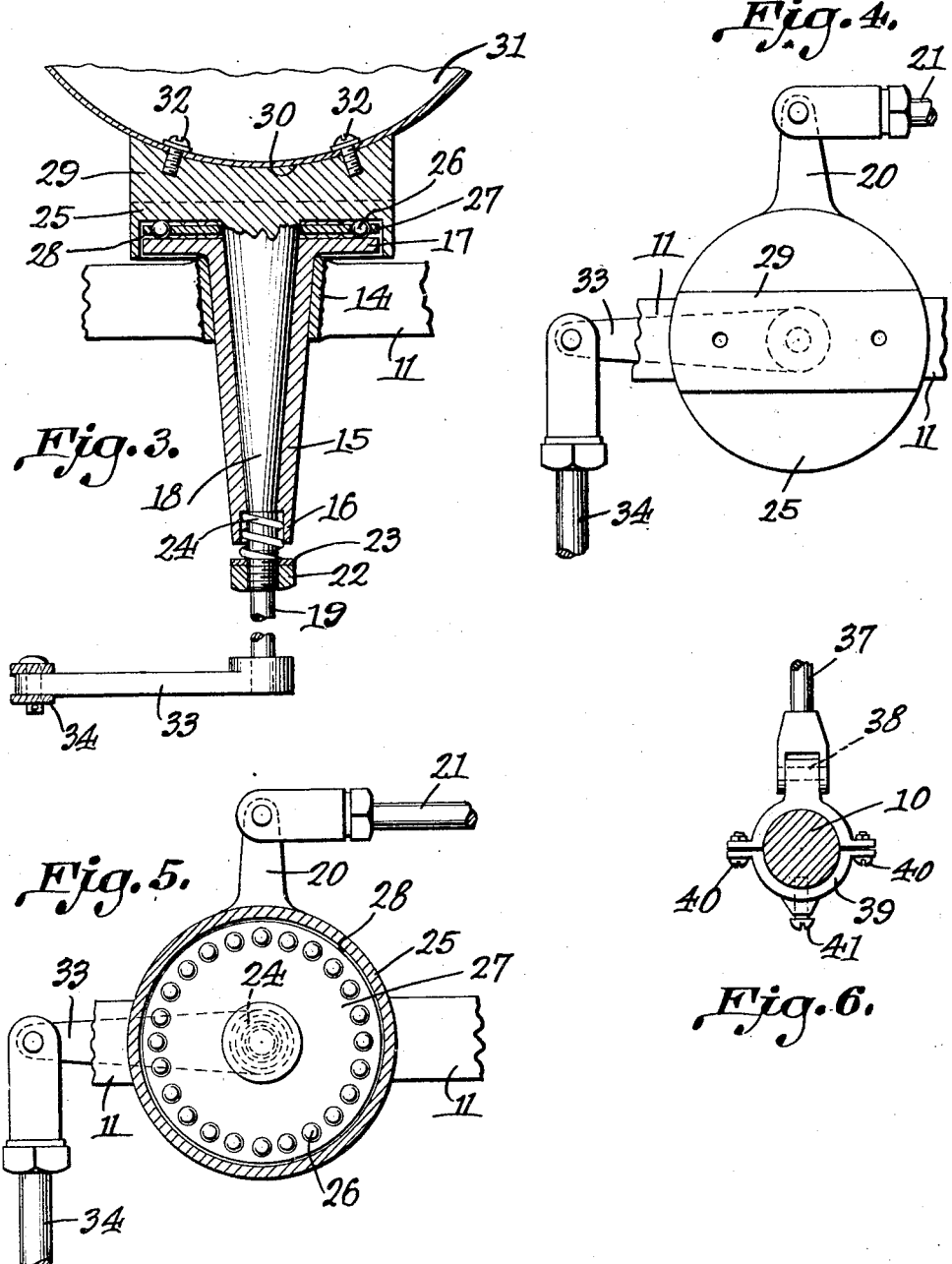
M. S. Kelley Inventor
By C. A. Snow & Co.
Attorneys Patented July 31, 1928.

1,678,911

UNITED STATES PATENT OFFICE.

MARION S. KELLEY, OF SOUTH BEND, WASHINGTON.

DIRIGIBLE HEADLIGHT.

Application filed October 25, 1926. Serial No. 144,114.

This invention aims to provide novel means whereby, when the steering mechanism of a vehicle is operated, the headlights will be turned, to follow the direction in which the vehicle is proceeding.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 3 is a sectional view showing one of the lamp supports;

Figure 4 is a top plan of the lamp support;

Figure 5 is a sectional view of the lamp support;

Figure 6 is a sectional view illustrating the connector.

Figure 1:
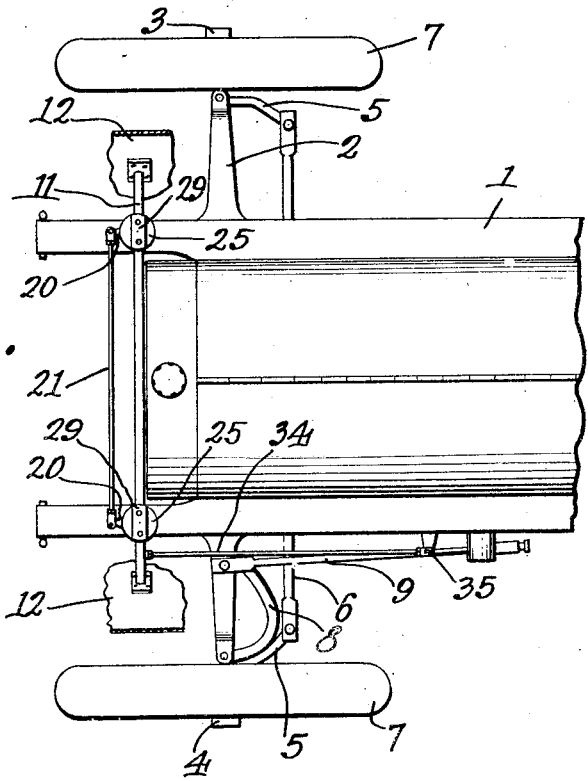
Figure 1 shows in top plan, a portion of an automobile whereunto the device forming the subject matter of this application has been connected.
Figure 2:
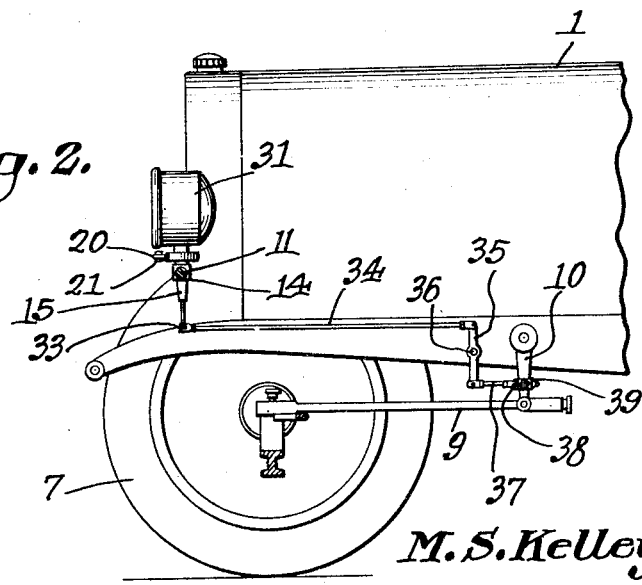
Figure 2 is a side elevation of the automobile, with the present improvement mounted thereon.

The numeral 1 marks an automobile including a front axle 2 having a movable axle end 3 and a movable axle end 4 provided with arms 5 to which a drag link 6 is pivoted. The forward wheels 7 are journaled on the axle ends 3 and 4. The axle end 4 has an arm 8 to which a rod 9 is pivoted, the rod 9 being pivoted to a crank arm 10 constituting a part of the steering mechanism of the vehicle. The device hereinafter described may, however, be connected operatively with steering mechanisms of widely different sorts.

A horizontal support 11, in the form of a rod, is connected at its ends to the forward fenders 12, and is supplied intermediate its ends with hubs 14 in which are secured conical bearings 15 provided in their lower ends with recesses 16. Each bearing 15 is equipped at its upper end with a circular disk-like head 17. In the bearing 15 is journaled a conical shaft 18 provided at its lower end with a reduced tip 19 having a forwardly extended arm 20. The ends of a longitudinally adjustable link 21 are pivoted to the arms 20. The tip 19 of the shaft 18 carries an adjustable abutment in the form of a nut 22 threaded on the tip 19, and a washer 23 superposed on the nut. A compression spring 24 surrounds the lower end of the conical shaft 18, the spring abutting against the bearing 15, within the recess 16, the lower end of the spring engaging the washer 23. The function of the spring 24 is to draw down the shaft 18 and to hold the disk-like top piece 25, at the upper end of the shaft 18, in contact with balls 26 held by a ball carrier 27 and located between the top piece 25 of the shaft 18 and the head 17 on the conical bearing 15. In its lower end, the top piece 25 has a recess 28 in which the head 17 and the ball carrier 27 are received loosely. The top piece 25 of the shaft 18 has an upstanding saddle 29 provided with a concavity 30 in which a lamp 31 may be seated, the lamp being held in place by securing elements 32 engaging the lamp and passing into the saddle 29.

One of the shafts 18 has a lateral arm 33 to which is pivoted a longitudinally adjustable link 34 pivoted to the upper end of the lever 35 fulcrumed at 36, intermediate its ends, on the frame of the vehicle, the lower end of the lever 35 being pivoted to a link 37 which is pivoted at 38 to a separable collar 39 held by clamp nuts 40, and a screw 41 or the like, on the crank arm 10.

In practical operation, the crank arm 10, the link 37, the lever 35, the link 34, the arm 33, the arms 20, and the connection 21, cause the lamps 31 to turn in accordance with the direction in which the vehicle is being steered, the highway being lighted up ahead, accordingly.

What is claimed is:—

In a device of the class described, a substantially horizontal support having a conical hub, a conical bearing seated in the hub and provided at its upper end with a disk-like head extended beyond the hub, a conical shaft journaled in the bearing and provided with a top piece in the form of a solid block having a recess in its bottom, the head of the bearing being received in the recess, anti-friction elements housed in the recess and located between the top piece and the head, a lamp, securing elements connecting the lamp to the top piece, spring means for moving the shaft endwise to hold the top piece engaged with the anti-friction elements, and means for rotating the shaft from the steering mechanism of a vehicle.

In testimony that I claim the foregoing as my own, I have hereto affixed my signature.

MARION S. KELLEY.